United States Patent Office 3,468,010
Patented Sept. 23, 1969

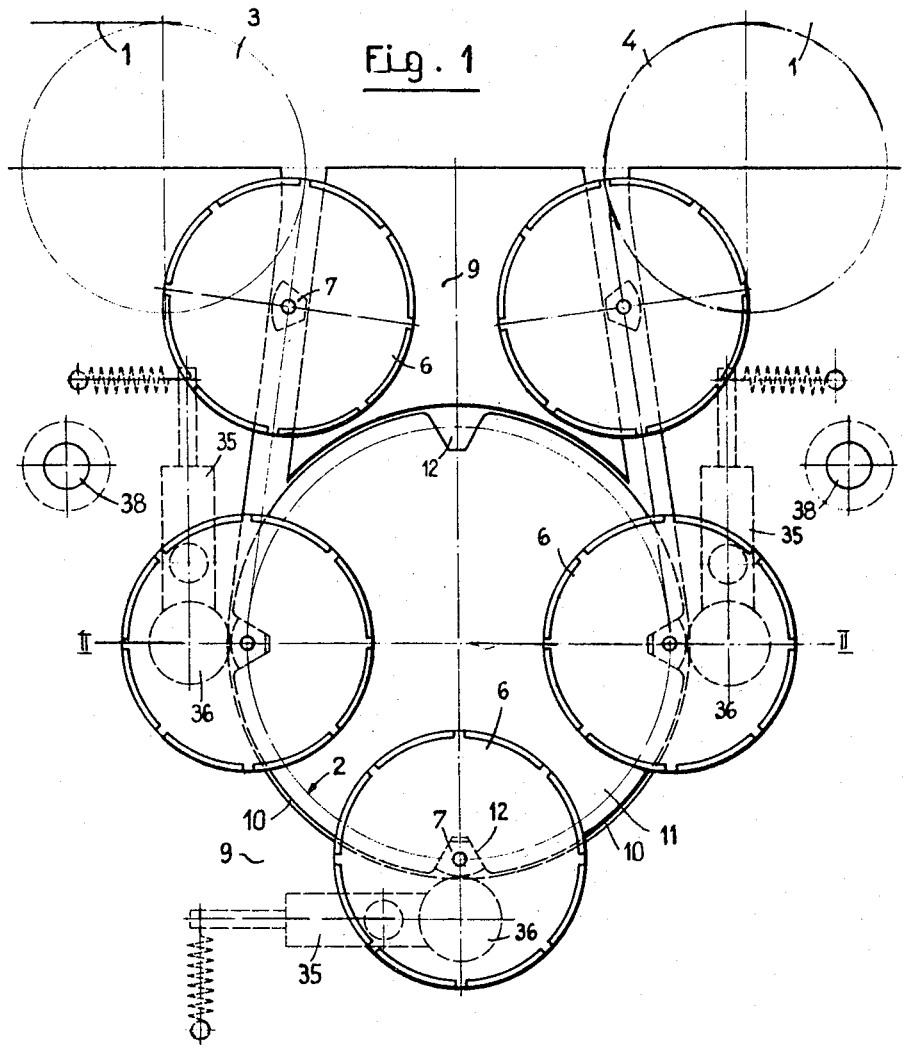

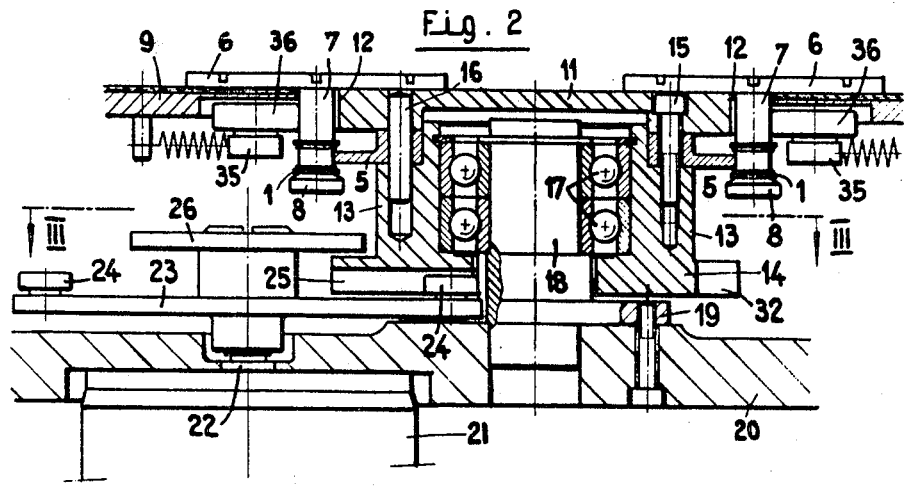
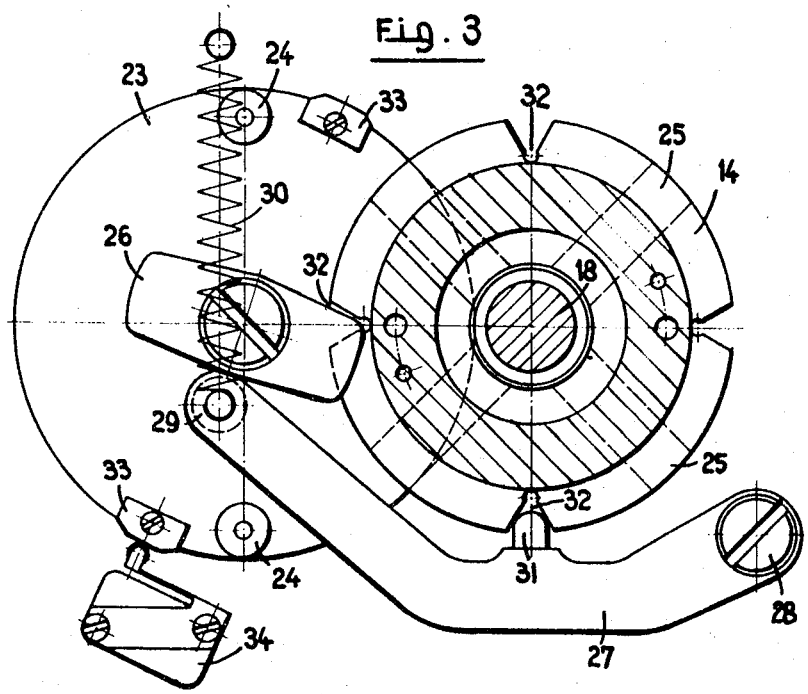

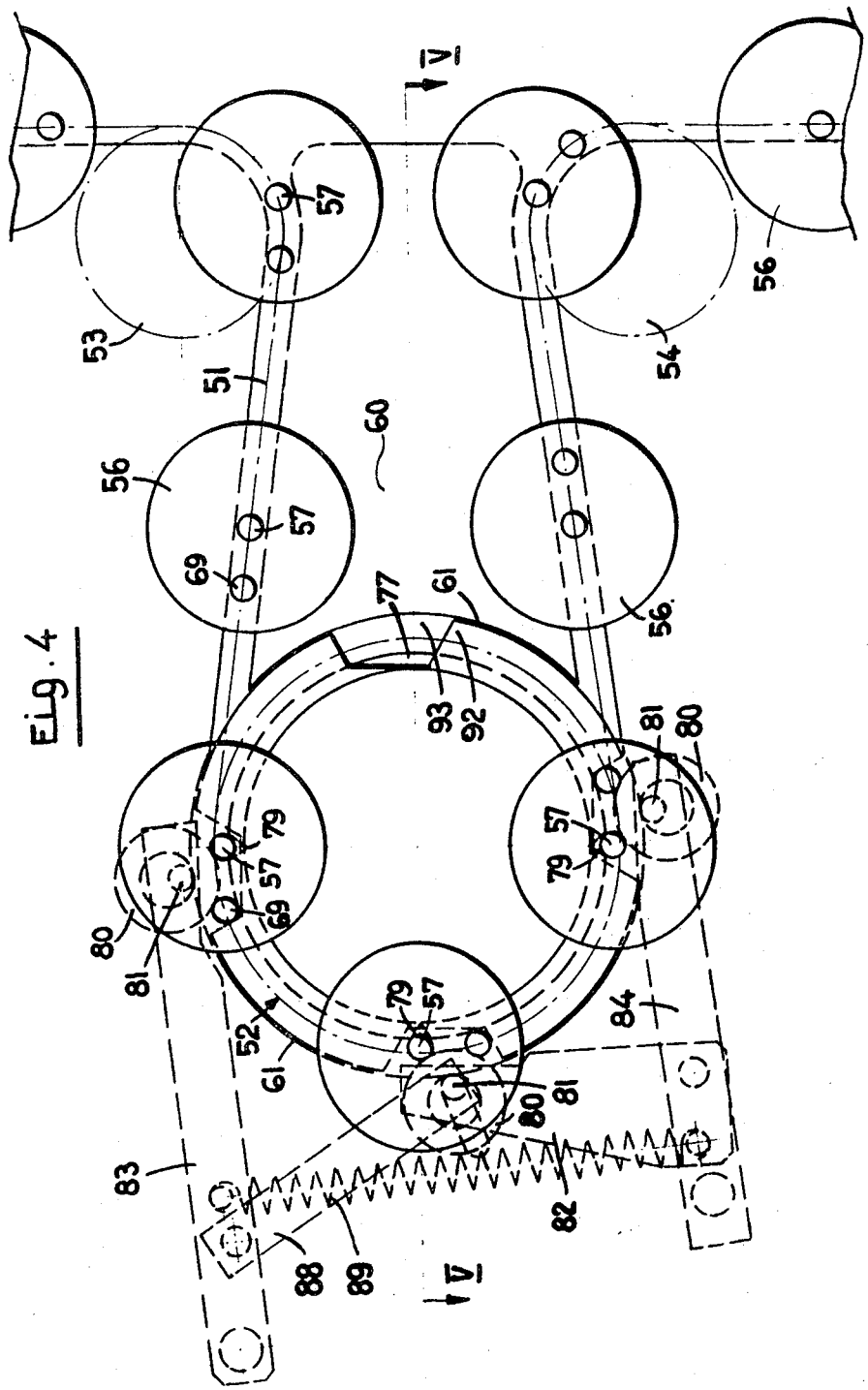

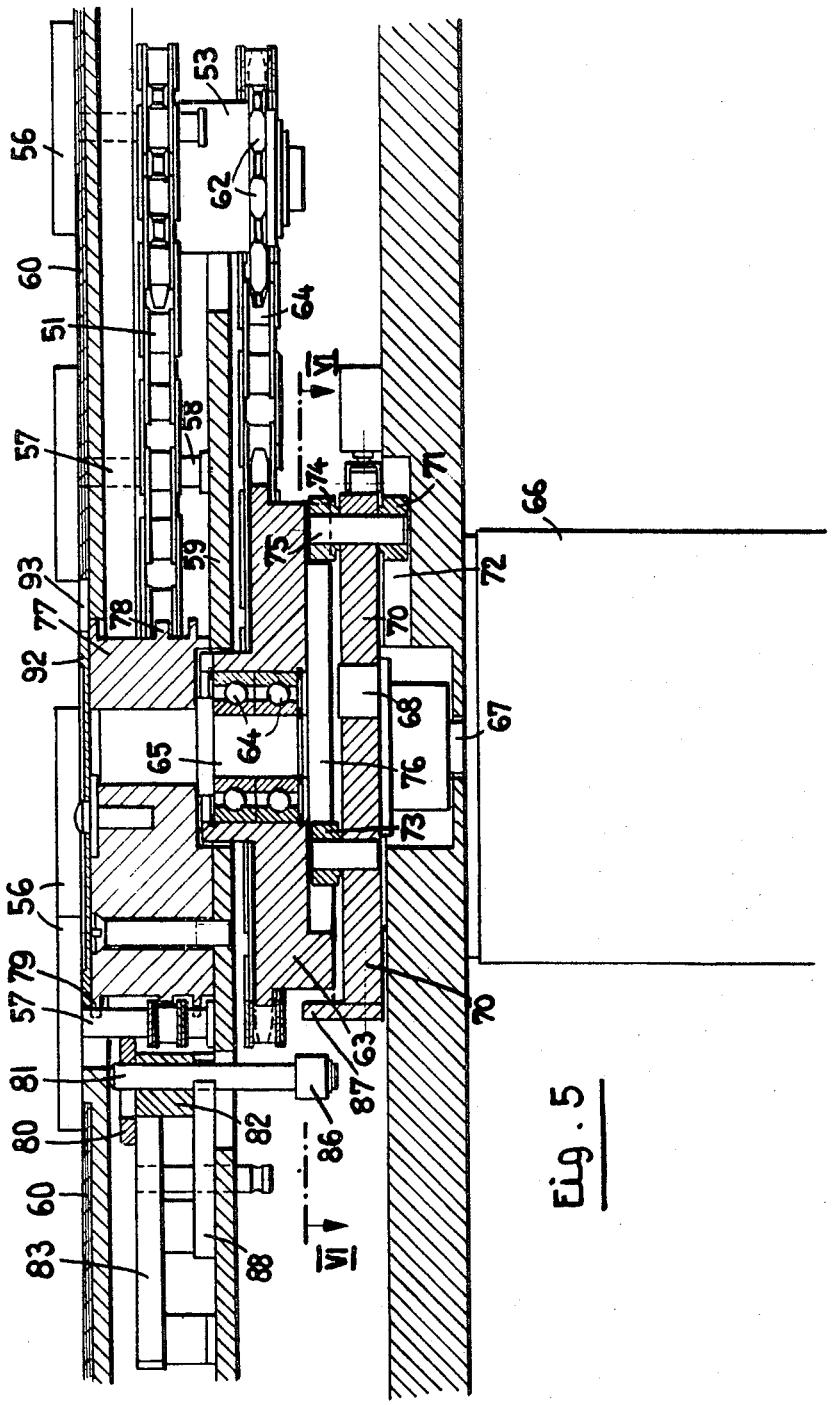

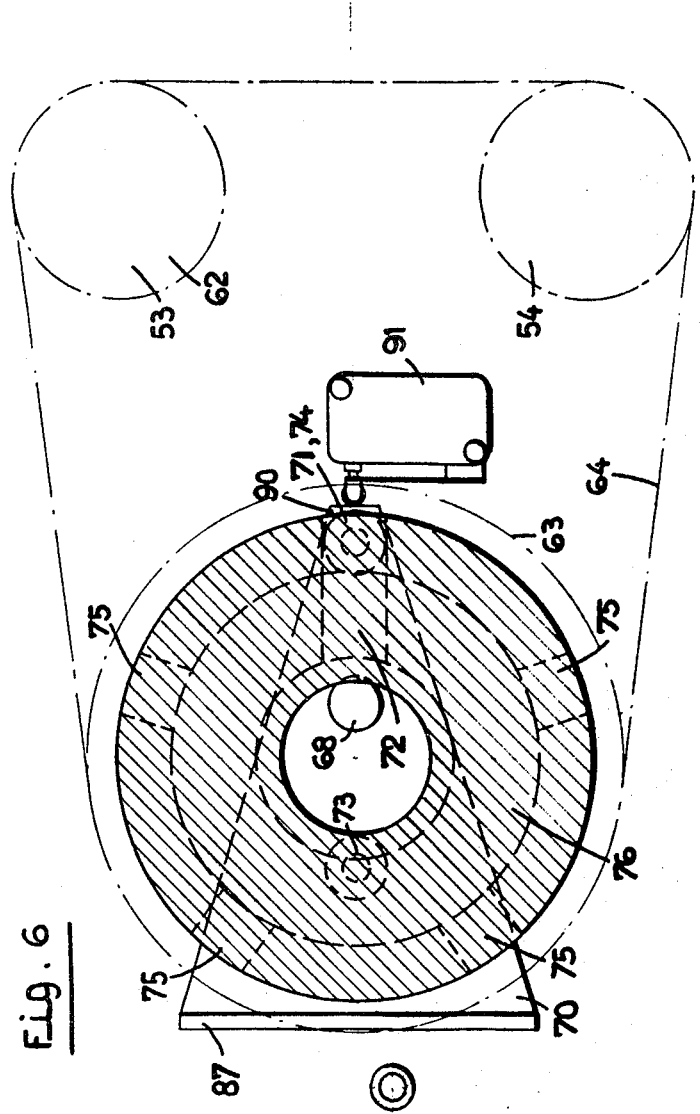

3,468,010
MACHINE FOR WORKING A SEQUENTIAL ASSEMBLY OF SIMILAR SMALL-SIZED APPARATUSES
Ernst Stauber, Lengnau, near Biel, Switzerland, assignor to Langendorf Watch Co., Langendorf, Switzerland, a body corporate of Switzerland
Filed Dec. 13, 1966, Ser. No. 601,450
Claims priority, application Switzerland, Dec. 14, 1965, 17,273/65
Int. Cl. B23p *19/00*
U.S. Cl. 29—200      11 Claims

ABSTRACT OF THE DISCLOSURE

A machine for enabling a sequential assembly of similar small-sized apparatuses including a conveying means carrying piece holders in intermittent steps to a work area. Positioning means are provided at the work area, independent of the conveying means, for locating each piece holder in a predetermined position so that an operation can be performed on the piece carried thereby, and so that exactly the same operation can be performed at exactly the same place on each succeeding piece moved to the work area.

---

This invention relates to the art of assembling and/or machining and more particularly it relates to an improved machine or system for sequentially assembling or otherwise operating on similar small-sized apparatuses, such as microswitches, voltmeters, ammeters and the like, but particularly of watch movements.

Known machines of this general type comprise a housing destined to be placed on the working table of a worker and furthermore comprise a working place and conveying means for transporting and guiding a number of piece holders in closed path. This path is arranged for its greater part inside the housing and only a relatively short loop in comparison with the whole length of the path passes outside the housing through the working place. By means of conveying means which are for example controlled by the worker and which transport and guide the piece holders along the said path, these piece holders can be brought stepwise and sequentially out of the housing and to the working place, which has the form of a platform and can then, after the working has been completed, be brought back into the housing. Thus the small-sized apparatuses on the piece holders, with the exception of the one which is being worked on the working place at this particular moment or perhaps one or two immediately following or preceding small-sized apparatuses are always protected from dust in the housing.

In the known machines of this type, the working place is formed as a platform which is also used as a vertical stabilising support for the piece holders, and the platform is provided with a slot for connecton members which extent between the conveying means, located below this platform, and the piece holders which are located on either side of the slot directly on said platform. For manual working of small-sized apparatuses which are secured in this manner to the platform by and in the piece holders this positioning at the end of each step of the conveying means suffices. But for a fully automatic and mechanical working of the small-sized apparatuses, e.g., controlled by the conveying means this positioning is insufficient because, due to variations in length within the conveying means, which, e.g., may be an endless chain, there are always differences, possibly only very minor, in the positioning of successive small-sized apparatuses on the working place.

It is an object of the present invention to eliminate even these very minor differences and to provide a positioning which is exact to fractions of millimeters, for all small-sized apparatuses which are brought to the working place at the end of a transportation step so that by means of fixed tools on the working place each of the backed small-sized apparatuses can be worked in precisely the same manner and on precisely the same spot for inserting of parts, screwing of screws in prepared tapped holes, lubricating of bearings, and so on.

In accordance with the present invention, there is provided a system or machine which is characterised in that at least one, and preferably more than one of the piece holders conveyed to the working place by conveying means at the end of each transportation step can be fixed in precisely the same operating position as the preceding or following piece holders on its or their working side by means of positioning members, which are independent of the conveying means, thereby eliminating all possible errors which might be due to the deformation of the conveying means.

Two embodiment of machines according to the invention are partially illustrated in a schematic view in the accompanying drawing, in which:

FIG. 1 is a top view of the platform used as a working place in its first embodiment, wherein three piece holders and their small-sized apparatuses are simultaneously precisely positioned for a working process at the end of each transportation step;

FIG. 2 is a cross-section along the line II—II of FIG. 1;

FIG. 3 is a cross-section along the line III—III of FIG. 2;

FIG. 4 is a top view similar to the one in FIG. 1 of a platform used as a working place for up to three sequential processes of a second embodiment;

FIG. 5 is a cross-section along the line V—V of FIG. 4; and,

FIG. 6 is a cross-section along the line IV—IV of FIG. 5.

In the embodiment of FIGS. 1–3 the reference numeral 1 designates a portion of an endless conveying chain, which is arranged for its greater part in a housing (not illustrated) and which is guided on pulleys so as to follow a zig-zag shaped path. At one point between two rollers 3 and 4, the chain 1, leaves the housing and forms on this path, outside the housing, a noose or loop 2 around a chain wheel 5 (FIGURE 2). On the chain 1, plate-shaped piece holders 6 are equally spaced each for a small-sized apparatus; these piece holders being rigidly secured to the links of the chain 1 by coupling devices 7 so that they cannot turn in relation to the chain links. The coupling devices may, for example, be pressed onto the links of the chain. On the side opposite to the piece holder 6 the chain links are provided with pads 8, as shown in FIGURE 2. An aperture in the housing allows the loaded piece holders to leave this housing and to proceed to a platform 9, used as a working place, which receives the piece holders 6 coming from the housing and serves as a stabilising support for such piece holders 6. The chain 1 is led underneath this platform 9 and the coupling devices 7 traverse a slot 10 in the platform, which follows the loop or noose-shaped path of the chain underneath this platform 9.

The part lying inside the noose of the path on the working place of the platform 9, i.e., the inside boundary of the loop 2 is constituted by the periphery of a positioning disc 11. This positioning disc is provided with four V-shaped recesses 12, which are disposed to one another at 90°, whose shape corresponds precisely to the cross-section of the coupling devices 7 between the chain links and the piece holders 6. The positioning disc 11 with the recesses 12 is rigidly secured to a boss 13 of a graduated plate 14.

This boss 13 also receives the chain wheel 5 and screws 15 or pins 16 connect positioning disc 11, chain wheel 5 and graduated plate 14 to a block which is pivotably mounted on a pivot 18 by means of ball bearings 17. The pivot 18 is screwed to the base plate 20 of the device over a flange 19. In addition thereto the casing 21 of an electric motor is also secured from below to this base plate 20, and the motor shaft 22 traverses through the base plate 20. That portion of the motor shaft above the base plate 20 carries a disc 23 which in turn carries on its periphery two diametrically and oppositely disposed rollers 24 which are freely rotatable. In the graduated plate 14 there are two grooves 25 which form a Maltese cross. The rollers 24 of the disc 23 work together with this Maltese cross to form a Geneva drive mechanism wherein each half turn of the disc 23 results in a turn of 90° of the graduated plate 14 and thus of the chain wheel 5 and of the positioning disc 11. Furthermore a two-armed lever 26 is pivotably connected to the disc 23 and the exterior surfaces of the lever 26 form a cam for the operation of a locking lever 27. The locking lever 27 is pivotable about a pivot 28 and carries on its free end, a roller 29 which is in contact with the lever 26. A tension spring 30 presses the roller 29 continuously against the lever 26.

The locking lever 27 is provided with a projection 31 which is intended to work together with the four recesses 32 of the graduated plate 14, which are disposed to one another at 90° (FIGURE 3). When the motor in the housing 21 is operated, the graduated plate 14 is rotated by means of interengagement of the rollers 24 on the disc 23 in the grooves 25 of the graduated plate 14. As the plate 14 is rotated, the chain wheel 5 and the positioning disc 11 are also rotated. Thereby the chain wheel 5 moves the chain 1 and advances sequentially the piece holders 6, which are loaded with small-sized apparatuses, to the working place and then returns the same to the housing. In order that the pre-arranged operations on the advanced small-sized apparatuses of the working place can be sequentially effected it is necessary to stop the piece holders at the working place. In other words, the chain 1 has to be advanced intermittently or in steps. For this purpose the disc 23 is provided with two diametrically opposed contact cams 33, which control a switch 34, arranged in the feed circuit of the motor. Thus, whenever the projection 31 of the locking device 27 engages with one of the recesses 32 of the graduated plate, the switch 34 stops the motor and thus stops rotation of the disc 23 and the lever 26 carried thereby.

Because the disc 23 is provided with two contact cams and because one whole turn of the disc 23 results in a half turn of the graduated plate 14 with the chain wheel 5, each transportation step corresponds to one turn over 90° of the chain wheel. Thereby the position of the chain wheel 5 at the end of each of these transportation steps is precisely determined by engaging the projection 31 in one of the four recesses 32 of the graduated plate 14, which are disposed to one another at 90°. Simultaneously the coupling device 7 between the chain 1 and each piece holder 6 which at this moment is positioned at the circumferences of the positioning disc 11 is engaged in one of the recesses 12 of the positioning disc by means of spring-controlled levers 35, which on their free ends carry a roller 36.

The locking of the graduated plate 14 at the end of each transportation step is effected by engaging the locking device 31 into a recess 32 and by simultaneously engaging the coupling devices 7 of the piece holders, which are positioned on the working place. This locking into the recesses of the positioning disc 11, results in the piece holders on the working place being precisely in the same operating position as the piece holder or the piece holders at the end of the preceding or following transportation step. This is, each piece holder is fixed on the same place, because all possible errors with respect to the length of the chain or to the turning of the chain links are automatically corrected and eliminated by engaging of the coupling devices 7 into the recesses of the positioning disc 11 or by engaging of the projections 31 into the recess of the graduated plate.

It should be noted that in the illustrated example three piece holders 6 with their small-sized apparatuses are fixed to the platform 9 at the end of each transportation step forming practically three different working surfaces whereon different operations can be effected by means of rigidly fixed tools which might be housed for example in positioning openings 38 (FIGURE 1) provided in the platform.

In each instance, the positioning is exact within fractions of millimeters.

The chain 1 can be manually advanced by the worker for one further step after the pre-arranged operations have been effected on the small-sized apparatus or apparatuses on the platform as the described device is on his working table, or else, in case it is a fully automatic plant, it can be advanced by means of a timer or of control switches which are automatically actuated at the end of the prearranged operation or operations. In such an automatic arrangement, the switch 34 is bridged for a short time until it is closed after a short run of the motor and is only opened again by the next control cam 33 of the disc 23 at the end of the next transportation step.

When starting the motor the rotation of the lever 26 immediately releases the engagement between the graduated disc 14 and the projection 31 of the locking device 27, so that the disc 14 together with the chain wheel 5 and the positioning disc 11 can be turned by the rollers 24. At the end of the following transportation step that is to say, after the parts 14, 5 and 11 have been turned 90°, two of the three-piece holders on the working place as in FIGURE 1 are advanced to the next operation place in the direction of advancement of the chain whilst the first of these piece holders is on its way back to the housing. The place of the last of the three piece holders is now free for a new piece holder which is advanced by the chain 1 from the housing.

The embodiment illustrated in FIGURES 4–6 differs mainly from the one illustrated in FIGURES 1–3 in that the precise positioning of the piece holders with their small-sized apparatuses which are advanced to the working place is controlled by a stationary member instead of by a rotating member as in the embodiment shown in FIGURES 1–3, wherein the positioning of the piece holders at the end of each transportation step is effected finally by engaging the projection 31 into a recess 32 of the graduated plate 14 which rotates together with the positioning disc 11. Thus a further source of errors is eliminated.

As in the example shown in FIGURES 1–3 the embodiment of FIGURES 4–6 also illustrates an endless conveying chain 51 in a housing which follows a zig-zag shaped path and which leaves the housing in the form of a noose or loop 52 between two chain wheels 53 and 54. This chain 51 is also provided with plate-shaped piece holders 56 which are equally spaced to one another and each of which receive a small-sized apparatus. These piece holders are secured to the chain 51 by coupling devices 57 in such a manner that the piece holders 56 cannot turn in relation to the chain links. In the extension of the coupling devices 57 which traverse the chain 51 guides 58 are provided, which bring the chain 51 on its noose-shaped path 52 outside the housing, but also within the same, between their guiding pulleys to a stationary plate 59.

The loaded piece holders 56 which leave the housing with the chain 51 run with their bottom surface onto a platform 60, serving as a working place and forming a stabilising support for the piece holders. Thereby the chain 51 is led underneath the platform 66 and the coupling devices 56 traverse a slot 61 in the platform, which follows precisely the noose-shaped path of the chain 51 underneath the platform 60.

The drive of the chain 51 is effected by the chain wheels 53, 54 unlike the embodiment of FIGURES 1–3. For this purpose said chain wheels are provided with a second spur gear 62 as shown in FIGURE 5 for the chain wheel 53. Around these second spur gears of the chain wheels 53, 54 and around a further chain wheel 63 runs an auxiliary chain 64. This transmission by means of an auxiliary chain could naturally also be effected by a set of gears.

The chain wheel 63 is mounted on a pivot 65 underneath the working place over ball bearings 64 and is the driving wheel for the whole device. For this purpose a flanged electric motor 66 is arranged on the bottom side of the device underneath the working place, and the motor shaft 67 drives an eccentric 68. This eccentric in turn drives a triangular member 70 whose top end is guided by means of a roller 71 in a slot 72 and can perform translatory and straight movements.

The triangular member 70 carries two rollers 73, 74 on its surface, facing the chain wheel 63, such rollers being mounted on radial guides 75, which extend inwardly into a hollow chamber 76 in the bottom side of the chain wheel 63.

A cylindrical block 77 is screwed to the plate 59, said block having radial projections 78 on the surface of the portion which is encircled by the chain 51 for a smooth guidance of this chain 51 with the piece holders. This block 77 is provided on its circumference with four grooves 79 which are disposed to one another at 90°, and three of these grooves 79 serve for the exact positioning of the piece holders 56, which are advanced by the chain 51, at three different working positions at the end of each transportation step. This is achieved by pressing the connecting members 57 of the piece holders 56, which reach these positions, into these grooves 79 by means of a lever arrangement and locking the members 57 in these grooves until the next transportation step. An eccentrically located pin 69 is pressed against the circumference of the block 77 on the bottom side of the piece holder. Thus the radial positioning of the piece holder is also achieved. This pressing and locking is performed on the respective piece holders by resilient rings 80 located on pins 81 on the levers 82, 83 and 84.

The lever 82 carries a roller 86 on the lower end of its pin 81 which is engageable with a cam 87 on the triangular member 70 to move the lever 82 into operative or inoperative position. A guide rod 88 transfers the pivoting movements of the lever 82 to both the other levers 83 and 84, which are connected together by a spring 89, so that all three pins 81 and their pressing rings 80 press and lock simultaneously the connecting members 57 into the recesses 79 or alternatively release them from these recesses for advancement.

Instead of pressing each piece holder 56 or its connecting piece 57 against a groove 79 by means of a lever arrangement as described in the above example, it is naturally also possible to reverse this process and to provide a suitable groove 79 on the surface of the lever so that the surface of the block 77, which in this case has no grooves, can act as an abutment. This solution which is similar to the illustrated one allows also the same precise positioning of the piece holders.

During the operation of the machine according to FIGURES 4–6 the chain 51 together with the piece holders 56 is moved towards the chain wheels 53, 54, by the drive. Inside the housing of this device the chain can be tightened by one of the familiar tensioning devices. When passing the working place outside the housing the tension of the chain 51 may lead to errors in view of the spaces between the piece holders, which would make the precise positioning of the same impossible without supplementary means at the working positions at the end of each transportation step. When the noose 52 passes between the chain wheels 53, 54 the chain 51 is led loosely around the block 77 in the described embodiment. Thus the most important requirement for precise positioning of the piece holders 56 on the working places is met.

The figures show the parts in their position at the end of a transportation step, that is to say in their position at rest, in which they remain during the working process of the small-sized apparatuses on the platform.

The motor 66, after the prearranged operation is completed for the next transportation step, can be manually operated by means of a push button, a timer or fully automatically by the working tools. For this purpose a triangular member 70 is displaced by the eccentric 68, and operates a contact cam 90 and thus a switch 91, whose function corresponds to the one of the switch 34 in FIGURES 1–3. Immediately after it starts moving, the member 70 disengages its cam 87 from the roller 86, and through operation of the guide 88, disengages the levers 82, 83, 84 the pins 81 and their rings 80 and the connection members 57, from the grooves 79, of the piece holders on the working place, on whose small-sized apparatuses an operation has just been completed. A further rotation of the eccentric 68 releases the roller 74 from the radial groove 75 of the chain wheel 63, whilst simultaneously the roller 73 engages in its opposite radial groove 75. A further rotation of the motor and displacement of the member 70 together with the roller 73 entails now a rotation of the chain wheel 63 until the roller 73 disengages the groove 75 so that simultaneously the roller 74 can again engage with the opposite groove 75. Thus a further transportation step is completed and the contact cam 90, by actuating the switch 91, has interrupted the feed circuit for the motor 66 in the new position for the components.

In comparison with the Maltese cross used in the first embodiment for effecting the transportation step the arrangement of the second embodiment has the advantage, that the tension is higher in the middle of the transportation step, so that the inertia of the individual rotating parts does not have to be considered in order to overcome the critical point of motion. In addition, this arrangement results in a more constant speed of the motion, in contrast to the first embodiment where the speed decreases to zero at the end of each transportation step. The speed ratio is chosen in such a manner that each rotation of the chain wheel 63 through one fifth of its circumference displaces the chain 51 together with the piece holders at 90° on the block 77, so that at the end of each transportation step another piece holder is pressed into each of the recesses 79 by the rings 80 and is locked in this position. The block 77 is provided with a thin disc 92, which is freely rotatable. This disc 92 has V-shaped grooves 93, which are disposed to one another at 90°. The connection members 57 of the piece holders 56 engage in these grooves 93, and, when moving on, take the disc 92 with them. This disc 92 serves as a cover for the platform within the noose and also as an inside boundary of the slot 61, so as to keep the same as narrow as possible thereby preventing tools which are handled at the working place from falling through said slot.

It is understood that this slot is also kept as narrow as possible in the embodiment illustrated in FIGURES 1–3.

Furthermore it has to be considered that, in the two described embodiments, the supports for the piece holders on the working place are constructed in such a manner, that even operations of the small-sized apparatuses which involve hammering can be effected.

Finally it is understood that the piece holders are constructed in such a manner that the small-sized apparatuses may be locked in a certain position if so required.

I claim:
1. A machine adapted to be utilized upon an operator's working table for enabling a sequential assembly of similar small-sized apparatuses, said machine comprising a housing means adapted to be placed upon said working table, working means remote from said housing means but disposed adjacent thereto, conveying means formed as a closed loop, a plurality of piece holder means coupled with said conveying means, guide means for maintaining the major portion of said conveying means closed loop within said housing means but for directing a minor portion of said conveying means closed loop across said working means, driving means cooperable with said conveying means to sequentially and intermittently advance said conveying means and said piece holder means carried thereby to dispose at least one of said piece holder means at said working means, and positioning means indepedent of said conveying means for precisely positioning said piece holder means in a predetermined position at said working means, said device thereby assuring that each succeeding piece holder means will be located precisely at said predetermined position even if said conveying means experiences deformation during advancing thereof.

2. A machine according to claim 1, wherein said positioning means includes a positioning disc forming an inner boundary on the working means, said positioning disc being simultaneously and stepwise driven with the transport of said piece holder means and being provided with recesses for each of the piece holder means wherein at least one part of the piece holder means engages, and wherein said driving means includes a graduated disc which rotates in synchronism with the positioning disc, said graduated disc having recesses therein cooperable with a locking device.

3. A machine according to claim 2, wherein said conveying means further includes a chain wheel for driving said closed loop which forms an endless chain, and wherein said positioning disc, graduated disc, and chain wheel are coaxially secured to one another to form a block and are stepwise movable by said driving means which further includes a motor and means cooperative with said graduated disc to form a drive in the shape of a Maltese cross.

4. A machine according to claim 3, in which the positioning disc constitutes a platform at the working means for support of the piece holder means whilst the conveying means are led underneath said platform and wherein connection members are provided between the conveying means and the piece holder means to engage in recesses in the positioning disc.

5. A machine according to claim 4, wherein said positioning means further includes resilient levers which, at the working means act on the connection members to press the same into the recesses of the positioning disc.

6. A machine according to claim 3, further including a control cam for the locking device which moves in synchronism with the drive for the Maltese cross and which releases the locking of the graduated disc to permit successive advances of said conveying means.

7. A machine according to claim 4, in which the said block is mounted in bearings which take up axial loadings of said block.

8. A machine according to claim 1, in which apertures are provided on the working means in precisely the place where the operation or the operations are to be effected on said pieces carried by said piece holder means, said apertures receiving the required tools to perform said operations.

9. A machine according to claim 1, wherein said conveying means together with the piece holder means are conducted around a cylindrical and stationary block on the working means, said block having grooves formed therein and wherein connection members are provided to connect the piece holder means and the conveying means, said connection members being engaged in said grooves at the end of each transportation step to lock said device in this position.

10. A machine according to claim 9, in which the piece holder means are transported along the minor portion of said conveying means which passes around the working means and by means of an auxiliary drive on chain wheels which is located on said minor portion so that the tension of said minor portion can be eased.

11. A machine according to claim 1 wherein said positioning means includes a freely rotatable disc which receives the piece holder means, coming to the working means, said disc forming a support for the working operation and also forming a cover for a slot which is provided for at least minor portion of said conveying means.

References Cited

UNITED STATES PATENTS

| | | |
|---|---|---|
| Re. 25,886 | 10/1965 | Cargillo. |
| 2,934,816 | 5/1960 | Van Nest et al. |
| 3,063,709 | 11/1962 | Williams et al. _____ 29—203 |
| 3,066,396 | 12/1962 | Erkelens et al. _____ 189—19 |
| 3,077,660 | 2/1963 | Essenberg _____ 29—208 |
| 3,103,023 | 9/1963 | Zdanis _____ 29—208 X |
| 3,201,860 | 8/1965 | Horberg _____ 29—203 X |

THOMAS H. EAGER, Primary Examiner

U.S. Cl. X.R.

29—203, 208